United States Patent [19]
Ochia

[11] 3,718,374
[45] Feb. 27, 1973

[54] SKID CONTROL SYSTEM FOR AUTOMOTIVE VEHICLES

[75] Inventor: Takeshi Ochia, Toyota-shi, Aichi-ken, Japan

[73] Assignee: Toyota Jidosha Kogyo Kabushiki Kaisha, Aichi-ken, Japan

[22] Filed: June 30, 1970

[21] Appl. No.: 51,117

[30] Foreign Application Priority Data

July 1, 1969 Japan.................................44/51477

[52] U.S. Cl.............303/21 A, 188/181 C, 235/197, 303/21 BE, 307/229
[51] Int. Cl........................................B60t 8/08
[58] Field of Search ...73/39, 515; 188/181; 235/197; 303/20, 21; 307/118, 229; 328/142; 340/229

[56] References Cited

UNITED STATES PATENTS

| | | | |
|---|---|---|---|
| 3,498,682 | 3/1970 | Mueller et al. | 303/21 BE |
| 3,433,536 | 3/1969 | Skinner | 303/21 A |
| 3,506,810 | 4/1970 | Katell | 235/197 X |
| 3,413,456 | 11/1968 | Sutton | 235/197 X |
| 3,401,984 | 9/1968 | Williams et al. | 303/21 BE |
| 3,467,443 | 9/1969 | Okamoto et al. | 303/21 BE |
| 3,443,082 | 5/1969 | Abe | 235/197 |
| 3,523,195 | 8/1970 | Thomas et al. | 235/197 X |

*Primary Examiner*—Milton Buchler
*Assistant Examiner*—Stephen G. Kunin
*Attorney*—McGlew and Toren

[57] ABSTRACT

A skid control system for automotive vehicles having hydraulic brakes includes a wheel speed detector and a memory circuit connected to the detector to store the initial speed of the vehicle at the start of braking. A pressure detecting means is connected to the brake system to detect the fluid pressure during brake application, and a function generator converts the detected pressure into an arbitary function proportional thereto, and which is integrated. The integrated function is compared to the stored initial speed of the vehicle to derive a difference value which is amplified and supplied to a comparator connected to the wheel speed detector to provide a control signal. This control signal operates a servo mechanism to control the braking system in accordance with the control signal.

5 Claims, 6 Drawing Figures

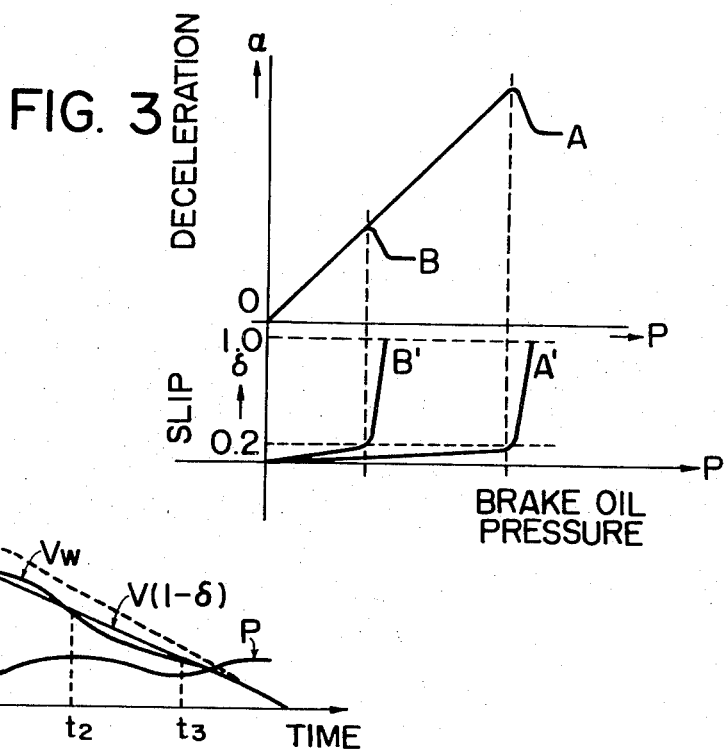
FIG. 3
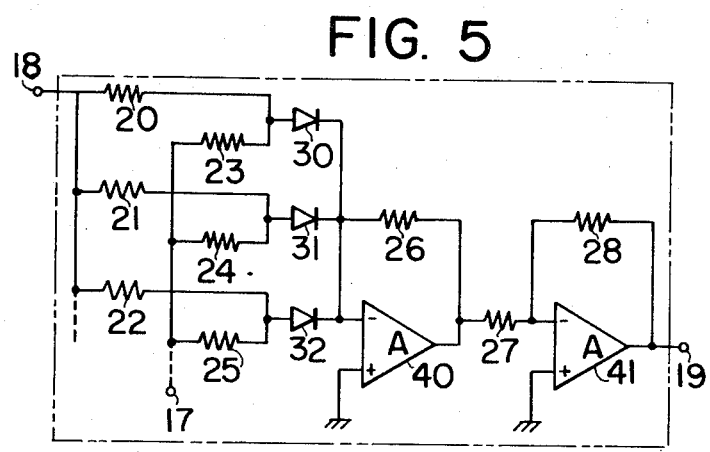
FIG. 4
FIG. 5
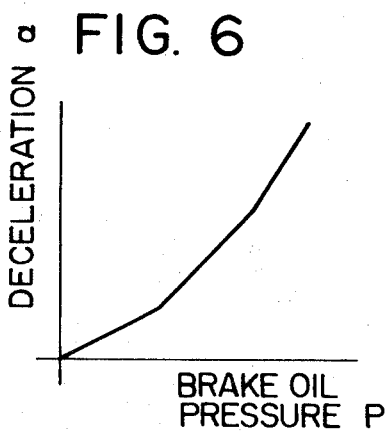
FIG. 6

SKID CONTROL SYSTEM FOR AUTOMOTIVE VEHICLES

BACKGROUND OF THE INVENTION

When a travelling automotive vehicle is braked hard, as during an emergency stop, the wheels are locked and slide over the road surface due to the inertia of the vehicle. This increases the stopping distance for the vehicle and also results in loss of control and directional stability of the vehicle. The result of this is the so-called "skid phenonmenon," which results in a hazardous or dangerous situation. In order to prevent the occurrence of a skid phenomenon, various skid control systems have been proposed to bring a vehicle to a stop in a minimum stopping distance and without locking the wheels.

A typical example of a prior art skid control system is illustrated in FIG. 1, wherein a speed detector 2, such as a DC generator, is coupled to a wheel 1 either directly or through a gear or belt transmission. The speed detector generates a voltage Vw proportional to the peripheral speed of wheel 1. A switch connects speed detector or controller 2 to a memory circuit 4, and disconnects memory circuit 4 from detector 2 upon initiation of braking and, at the same time, supplies an operation starting signal to an integrator 6. Memory circuit 4 memorizes the peripheral velocity of wheel 1 at the time of brake application, as an initial speed Vo.

A deceleration detector 5 detects acceleration or deceleration of the vehicle by positional deviation of a weight supported by, for example, a spring, the deviation being measured from a rest position of the weight at a time when acceleration or deceleration is zero. The deceleration detector converts the deviation to an electrical quantity. Integrator 6 integrates the output of $\alpha$ of a deceleration detector 5 from the start of brake application.

A subtractor 7 is connected to memory circuits 4 and to integrator 6, and subtracts the output $\sigma\alpha dt$ of integrator 6 from the output Vo, representing the initial speed, from memory circuit 4. An amplifier 8 amplifies the output Vs of subtractor 7 by a constant coefficient $(1 - \delta)$. A comparator 9 is connected to the output of amplifier 8 and to speed detector 2 and compares the output Vs of speed detector 2 with the output Vs$(1 - \delta)$ of amplifier 8, and supplies a control signal to a controller 10, such as a servo mechanism, which controls the application of hydraulic brakes 11 when the output of speed detector 2 is greater than that of amplifier 8, but releases the brakes when the output of speed detector 2 is less than the output of amplifier 8.

In the system shown in FIG. 1, memory circuit 4 memorizes the peripheral velocity Vo of wheel 1 at the instant the brakes are applied to wheel 1. Since, at this time, wheel 1 is rotating and not sliding, the stored value Vo can be regarded as the actual vehicle velocity at the time of brake application. Also at the time of brake application, integrator 6 is activated by switch 3 and starts to integrate the output $\alpha$ of deceleration detector 5. Furthermore, when subtractor 7 subtracts the output $\sigma\alpha dt$ of integrator 6 from the output Vo of memory circuit 4, the actual vehicle velocity at any given time during braking is obtained.

Generally speaking, when wheel 1 is braked, it slides to some extent, with the frictional braking torque being determined by the friction between wheel 1 and a road surface. The slip ratio $\delta$ is represented by $\delta = (V-Vw)/V$, wherein $Vw$ is the peripheral velocity of wheel 1 and $V$ is the actual vehicle velocity. As a result of experimentation, it has been shown that the frictional braking torque becomes a maximum when the slip ratio is approximately 0.2. Of course, the frictional brake torque varies slightly with the conditions of the road surface and with the tire conditions. When the relation between the peripheral velocity of wheel 1 and the actual vehicle velocity is $Vw = (1 - 0.2) = 0.8V$, a desirable braking is obtained with a minimum stopping distance and without skidding of the vehicle. In other words, if the amplification ratio of amplifier 8 is set at 0.8, the amplifier output provides the desirable peripheral velocity of wheel 1 during braking.

However, the system shown in FIG. 1 has the disadvantage that the use of a gravity type deceleration detector results in errors depending on the grade of a road surface or the attitude of the vehicle, resulting in the impossibility of obtaining a high degree of control.

SUMMARY OF THE INVENTION

This invention relates to a skid control system for automotive vehicles, such as automobiles, and more particularly to a novel and improved skid control system whose operation is independent of the grade of the road or the attitude of the vehicle.

The invention skid control system is based upon the relation between the pressure in a hydraulic brake system, during braking, and the deceleration of a vehicle, also during braking. Taking note of this relation, the present invention provides a skid control system of high accuracy and at a lower cost by utilizing, instead of a deceleration detector, which is sensitive to the grade of a road surface and to the attitude of a vehicle, a hydraulic brake system pressure detector and a function generator constantly connected to the pressure detector.

An object of the invention is to provide an improved skid control system for automotive vehicles.

Another object of the invention is to provide such a skid control system which has a high accuracy.

A further object of the invention to provide such a skid control system which is inexpensive and reliable.

Another object of the invention is to provide such a skid control system which is insensitive to the grade of a road surface and to the attitude of a vehicle.

A further object of the invention is to provide such a skid control system including a pressure detector for the fluid pressure in a hydraulic brake system and a function generator connected to the pressure detector.

For an understanding of the principles of the invention, reference is made to the following description of a typical embodiment thereof as illustrated in the accompanying drawings.

BRIEF DESCRIPTION OF THE DRAWINGS

In the Drawings:

FIG. 3 is a graphic illustration of the relation between the oil pressure in a brake system, the deceleration of a vehicle and the slip ratio when the oil pressure is amplified linearly;

FIG. 4 is a graphic illustration of the performance of the skid control system embodying the invention;

FIG. 5 is a schematic wiring diagram of a function generator forming part of the invention skid control system; and FIG. 6 is a graphic illustration of the characteristic of the function generator shown in FIG. 5.

DESCRIPTION OF THE PREFERRED EMBODIMENT

Figure 1:
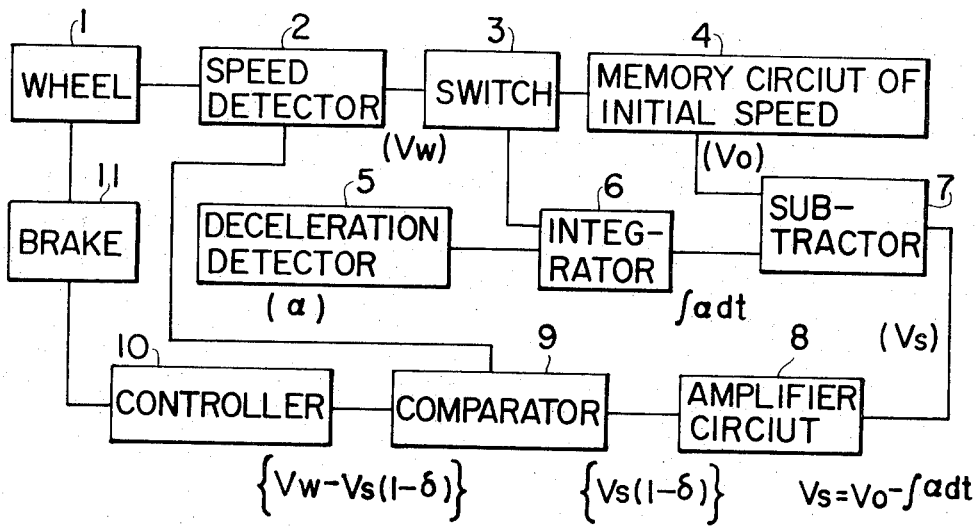
FIG. 1 is a block diagram of a conventional prior art skid control system.
Figure 2:
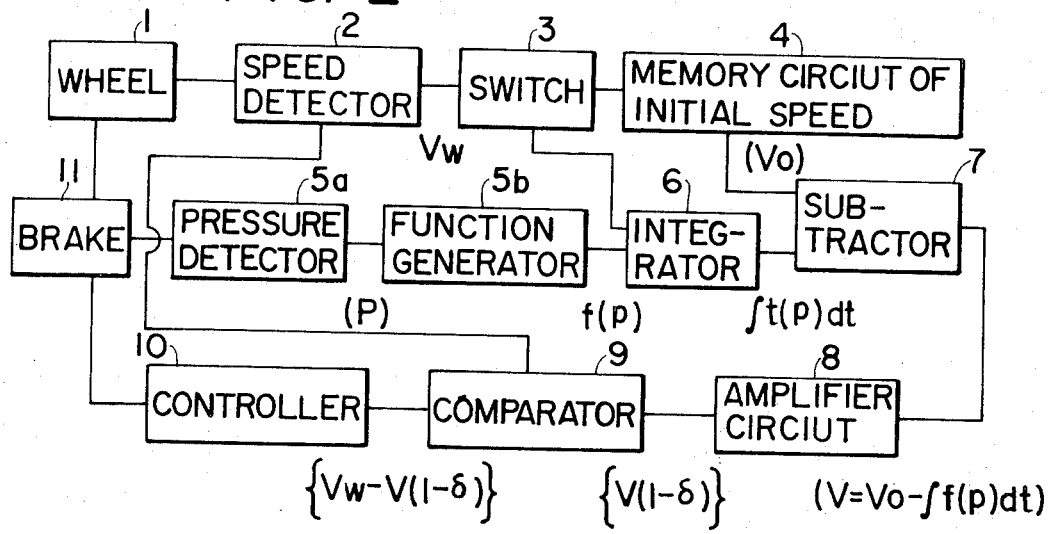
FIG. 2 is a block diagram of a skid control system embodying the invention.

Referring to FIGS. 2 through 6, which illustrate a preferred embodiment of the present invention, the components of the skid control system shown in FIG. 2 are the same as those shown in FIG. 1 with some exceptions, and consequently parts of FIG. 2, which are identical with the same parts of FIG. 1, have been indicated by the same reference numerals. One of the differences between the system shown in FIG. 2 and that shown in FIG. 1 is that the deceleration detector 5 of FIG. 1 is replaced by a pressure detector 5a, such as a distortion pressure gauge which detects, as an electrical signal, the pressure of the hydraulic fluid in the brake system. A function generator 5b is connected to the output of pressure detector 5a and converts that output to a value proportional to the deceleration of the vehicle. This function is obtained or derived as a result of experiments on vehicles.

An example of the function will now be described with reference to FIG. 3, in which the abscissae represent the pressure P of the fluid in the brake system 11, and the ordinates represent the deceleration $\alpha$ and the slip ratio $\delta$. Curves A and A' represent the deceleration and the slip ratio, respectively, of a vehicle on a high friction road surface. Curves B and B' represent these values on a low friction road surface.

As will be clear from FIG. 3, when the slip ratio $\delta$ is less than approximately 0.2, the relation between the fluid pressure P of the brake system and the deceleration $\alpha$ is linear, and therefore the relation $\alpha = KP$, wherein $K$ is a constant, is established. Accordingly, in this case, the deceleration $\alpha$ is readily obtained by multiplying the output $P$ of pressure detector 5 by $K$, using the function generator 5b.

The relation between the peripheral velocity or speed of wheel 1 and the actual vehicle velocity is graphically illustrated in FIG. 4, wherein the abscissae represent the time and the ordinates represent the wheel velocity and the fluid pressure in the brake system. The actual vehicle velocity is indicated by the curve $V$. The curves $Vw$ and $V(1 - \delta)$ represent the peripheral velocity of wheel 1, and that of wheel 1 when rotated with a slip $\delta$, respectively, when the frictional braking torque is at a maximum. The curve $P$ represents the time variation of the braking pressure.

Usually, the peripheral velocity $Vw$ of wheel 1 during travel of the vehicle is equal to the actual velocity $V$ at times in advance of the starting time $t1$ of the brake application. When brake application is started at time $t1$, the peripheral velocity $Vw$ at this time is stored as the braking initial speed $Vo$ in memory circuit 4. The actual vehicle velocity, obtained by substracting the integrated value $\int \alpha dt$ of the deceleration $\alpha$ from the initial speed $Vo$ will become $V$. The peripheral velocity of wheel 1, $V(1-\delta)=V(1-0.2)$, which is obtained by multiplying the actual vehicle velocity by the slip $\delta$, for example, 0.2, is based on the maximum frictional braking force. At the start of braking, the peripheral velocity $Vw$ is, of course, greater than $V(1 - \delta)$, and therefore braking is maintained. At the point $t2$ where the wheel starts to decelerate due to sliding and the value Vw becomes smaller than $V(1 - \delta)$, a brake releasing signal is derived from comparator 9, by means of which the braking is released without the fluid pressure in the braking system being suddenly reduced to zero. At the point $t3$ where the value $Vw$ becomes greater than $V$, a braking signal is again delivered from comparator 9 to again brake the wheels. By the repetition of these steps, the vehicle is gradually decelerated.

As previously mentioned, the present invention obviates the use of the inertia of a weight, as required in conventional skid control arrangements, and therefore highly accurate braking control is effected without being influenced by the attitude of a vehicle, the grade of a road surface, or the roughness of a road surface. Additionally, a pressure detector can be manufactured at a lower cost than the conventional gravity influenced deceleration detectors, and has excellent durability without being influenced by vertical vibrations or temperature changes.

If function generator 5b is constructed to have a non-linear characteristic rather than a linear characteristic, a control of higher accuracy can be effected. When the brakes are applied, the load distribution on the front and rear wheels is changed due to deceleration. Thus, the load on the front wheels is increased and that on the rear wheels is decreased, compared to the respective loadings without brake application. The larger is the frictional coefficient of the road surface, the greater is the deceleration, and accordingly the greater is the load variation. For example, if a speed detector is installed on the rear wheel to control braking, the variation in load on the rear wheel is small under a low braking pressure and small deceleration on a slippery road surface, and thus the relation between the braking pressure and the deceleration can be linear. On the other hand, on a non-slippery road surface, the load of the vehicle at the front wheels becomes greater due to a high braking pressure and a greater acceleration, while the load at the rear wheel is decreased. In this case, skidding is likely to occur at a lower brake pressure than in the case where no load variation is caused.

If the change in deceleration in relation to the output of the pressure detector is not greater than the linear function, the response to the actual deceleration becomes inaccurate, because the output of the pressure detector has a value lower than the required value. If the range between them is changed in the nth power ($n > 1$), the response between the brake pressure and the deceleration becomes accurate. In cases when the control is effected by detecting the rotation of the rear wheel, a function generator should be designed so that an $n$th power function is obtained at a high pressure rather than at a lower pressure. In the case of a front wheel speed detection, the nth power function should be obtained at a low pressure rather than at a higher pressure.

FIG. 5 is a wiring diagram illustrating a function generator 5b used with rear wheel speed detection. For this function generator, a conventional polygonal line approximation function generator, for use with an analog computer, is utilized. A voltage proportional to the braking pressure P is applied to input terminal 18 of the function generator 5b' and is amplified within the function generator to provide an output voltage proportional to $p^n(n \geq 1)$ is derived from output terminal 19. The anodes of diodes 30, 31 and 32 are connected to input terminal 18 through respective resistances 20, 21 and 22 of different ohmic values. The cathodes of these diodes are commonly connected to a negative input terminal of a first amplifier 40. Diodes 30, 31 and 32 are biased, in the reverse direction, from a terminal 17 through respective resistances 23, 24 and 25 of different ohmic values. The positive input terminal of amplifier 40 if grounded, and a feedback resistance 26 is connected between the output of amplifier 40 and its negative input terminal.

The output terminal of amplifier 40 is connected, through a resistance 27, to a negative input terminal of a second amplifier 41 whose positive input terminal is grounded. The output terminal of amplifier 41 also serves as the output terminal 19 of function generator 5b'. A feedback resistance 28 is connected between the output terminal of amplifier 41 and its negative input terminal. By means of the function generator shown in FIG. 5, an arbitrary deceleration curve, approximated by the polygonal line, in relation to pressure P is obtained as shown in FIG. 6. It is also possible to effect brake control in the same manner as described above by detecting the braking force applied during braking indirectly through measurement of the distortion of a wheel shaft or a wheel shaft bearing, instead of detecting the pressure in the braking system. In this case, a correction due to load variation on the wheel is also necessary. As mentioned above, a skid control system of higher accuracy can be obtained employing a non-linear function generator.

While a specific embodiment of the invention has been shown and described in detail to illustrate the application of the principles of the invention, it will be understood that the invention may be embodied otherwise without departing from such principles.

What is claimed is:

1. An automotive vehicle skid control system for a vehicle having plural wheels including front wheels and rear wheels, with at least one wheel being controlled, comprising, in combination, fluid pressure operated wheel brake applying means; speed detecting means operable to detect the speed of at least one wheel of the vehicle; memory means operatively connected to said speed detecting means to store the initial speed of the vehicle at the start of brake application; pressure detecting means connected to said brake applying means to detect the fluid pressure during brake application; non-linear function generating means connected to said pressure detecting means and operable to convert the value of the detected fluid pressure into a non-linear functional value related to deceleration; integrating means connected to said function generating means; deriving means connected to said memory means and to said integrating means and deriving the difference between said initial speed and the integrated value; amplifying means connected to said deriving means and operable to multiply the output of said deriving means by a factor dependent upon the slip of the wheel on a road surface; comparator means connected to said amplifying means and to said detecting means and operable to compare the output of said amplifying means with that of said speed detecting means; and servo mechanism connected to said comparator means and to said brake applying means and operable to control operation of the latter in accordance with the output of said comparator.

2. An automotive vehicle skid control system, as claimed in claim 1, in which said deriving means comprises a subtractor connected to said memory means and to said integrating means.

3. An automotive vehicle skid control system, as claimed in claim 1, in which said function generating means has an input terminal, an output terminal and a third terminal; plural diodes having their anodes connected to said input terminal through respective resistances of different ohmic values; a first amplifier having a negative input terminal commonly connected to the cathodes of said diodes; respective resistances, of different ohmic values, connected to said third terminal and biasing said diodes in the reverse direction; said first amplifier having a grounded positive input terminal; a feedback resistance connecting the output terminal of said first amplifier to its negative input terminal; and means connecting the output terminal of said first amplifier to the output terminal of said function generating means.

4. An automotive vehicle skid control system, as claimed in claim 3, in which said last named means comprises a second amplifier having a negative input terminal connected to the output terminal of said first amplifier through a resistance, and having a grounded input terminal; means connecting the output terminal of said second amplifier to the output terminal of said function generating means; and a second feedback resistance connecting the output terminal of said second amplifier to the negative input terminal thereof.

5. An automotive vehicle skid control system, as claimed in claim 4, in which the characteristic curve of said function generating means comprises a series of interconnected straight lines extending at angles to each other.

* * * * *